Dec. 25, 1962 D. K. COLE ET AL 3,069,920
TIMING CHAIN VIBRATION DAMPER
Filed Oct. 17, 1960 2 Sheets-Sheet 1

INVENTORS
Dale K. Cole &
BY James C. Kaufeld
E. W. Christen
ATTORNEY

Dec. 25, 1962 D. K. COLE ET AL 3,069,920
TIMING CHAIN VIBRATION DAMPER
Filed Oct. 17, 1960
2 Sheets-Sheet 2

INVENTORS
Dale K. Cole &
BY James C. Haufeld
E. W. Christen
ATTORNEY

United States Patent Office 3,069,920
Patented Dec. 25, 1962

3,069,920
TIMING CHAIN VIBRATION DAMPER
Dale K. Cole, Pontiac, and James C. Kaufeld, Rochester, Mich., assignors to General Motors Corporation, Detroit, Mich., a corporation of Delaware
Filed Oct. 17, 1960, Ser. No. 63,191
1 Claim. (Cl. 74—240)

This invention relates to timing chain vibration dampers, and more particularly to a means of eliminating the vibrations set up in internal combustion engine timing chains due to variations in rotational torque.

In the design and manufacture of automotive type internal combustion engines, it is the usual procedure to provide a camshaft for driving the intake and exhaust valves, and to drive such camshaft by means of a timing chain or belt off the engine crankshaft.

The engine crankshaft rotated by the pistons of the engine, is subject to torsional vibrations caused by the action of the pistons. As each piston moves downwardly on its power stroke it tends to cause an acceleration of rotation of the crankshaft. Also, as each piston moves upwardly on its compression stroke it tends to cause a deceleration of rotation of the crankshaft. These accelerations and decelerations set up torsional vibrations in the engine crankshaft which incite chain slack and chain whip in the timing chain.

The camshaft of the internal combustion engine is also subject to variations in the torque required to cause it to rotate. These variations are due to the cyclic nature of the valve spring loads which, when the valve is open, offer resistance to the rotation of the camshaft. In an engine having a relatively few number of cylinders, such as four-cylinder engine, the valve timing and duration is normally such that the spring loads from different valve springs combine to form higher resultant torques varying from positive to negative, i.e., either resisting or aiding in the rotation of the camshaft.

The effect of variations in these torques in the crankshaft and camshaft is to cause the timing chain to become alternately tight and slack. This results in a rattling noise, which is easily heard and is objectionable to the operator, at idle or low engine speeds and also results in a rapid rate of wear of the timing chain.

Numerous devices have been employed in the past to overcome these problems. Most notable are the provision of idler gears, or the like, engaging the timing chain between the crankshaft and the camshaft. Rather than idler gears, some devices utilize a plain roller which does nothing more than tighten the timing chain between the two shafts.

The generally available devices for taking up vibrations and wear do not fully accomplish the purpose for which they are intended. With idler sprockets or idler rollers the engagement of the teeth of the sprocket or of the surface roller with the timing chain tends to excite chain vibration at one or more engine speeds, thus adding to the vibrations caused by torque variations and increasing the wear on the timing chain.

The device in which this invention is embodied comprises, generally, a pair of bumper members mounted in an engine block and engaging opposite sides of a timing chain. The bumpers are spring biased toward each other, tending to take up slack in the chain and at the same time provide a frictional force resisting rotation of the chain and tending to take up the vibrations and alternate tightening and slackening of the timing chain.

This device positively eliminates the objectionable vibrations and has no adverse effect on the wear rate of the timing chain. The bumper members may be of such a material to wear at the engaging surfaces rather than the wear being taken by the timing chain. The bumper members are so constructed as to provide adequate service, even though affected by the constant movement of the timing chain and may be inexpensive enough, when compared to the cost of the timing chain, to be replaced when completely worn out. This results in a more economical construction, as well as a means for positively eliminating objectionable vibrations, wear and noise in the timing chain.

These and other advantages will become more apparent from the following description and drawings, in which.

Figure 1:
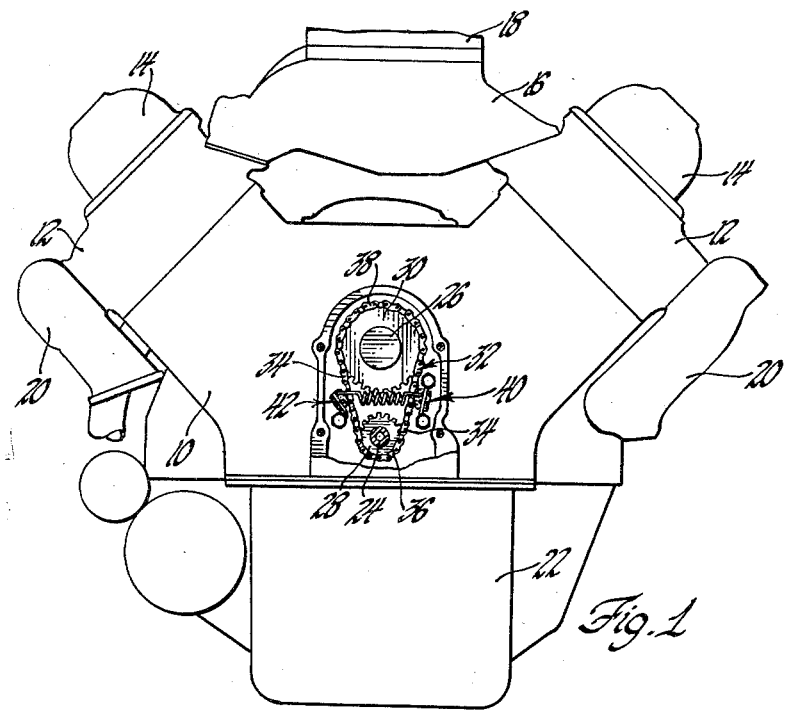
FIGURE 1 is a front end view of a typical internal combustion engine showing the timing chain and its position with respect to the remainder of the engine.

FIGURE 1 best illustrates an internal combustion engine and the position of the crankshaft, camshaft and the driving timing chain. An engine block 10, having the usual pistons and cylinders mounted therein, may be of any suitable construction, such as a conventional inline or V-type engine. For illustrative purposes FIGURE 1 shows a V-type internal combustion engine. A pair of cylinder heads 12 are provided on opposite sides of the engine block 10 and contain the usual intake and exhaust valves and operating mechanism. Suitable valve covers 14 are provided to contain the usual rocker arms and the like and to keep oil circulation within the engine. An inlet manifold 16 is provided between two cylinder heads 12 and may have mounted thereon a charge forming or carbureting device 18 of any suitable nature. Also secured to the cylinder heads 12 are exhaust manifolds 20 for conveying the exhaust gases from the cylinders to the atmosphere in some suitable manner. Disposed beneath the engine block 10 is an oil pan 22, which is conventional in nature and provides a sump for the oil circulation system.

Extending longitudinally through the engine is a crankshaft 24, driven by the pistons in the conventional manner. Also extending longitudinally of the engine is a camshaft 26 which has a plurality of cams formed thereon to actuate the intake and exhaust valves in the usual manner. Mounted on the crankshaft 24 is a sprocket gear 28 and mounted on the camshaft 26 is a sprocket gear 30. Trained around the sprocket gears 28 and 30 is a timing chain, illustrated generally by the numeral 32.

Figure 2:
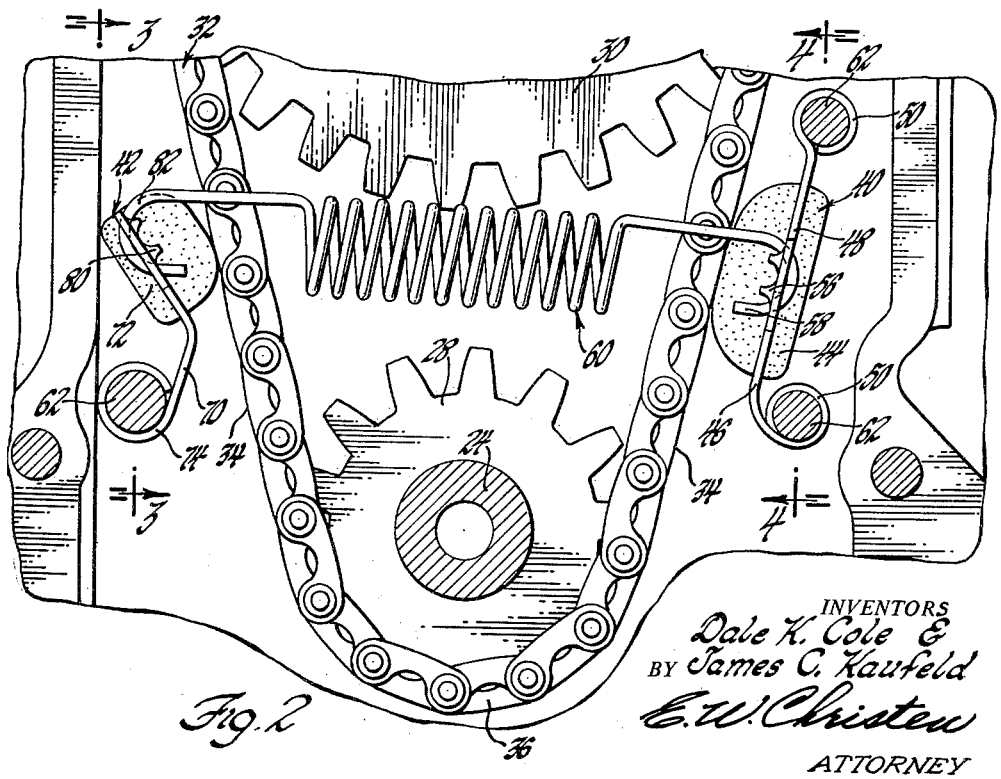
FIGURE 2 is an enlarged view of a portion of FIGURE 1, illustrating the bumper members embodying this invention and showing their location with respect to the engine and the timing chain.
Figure 3:
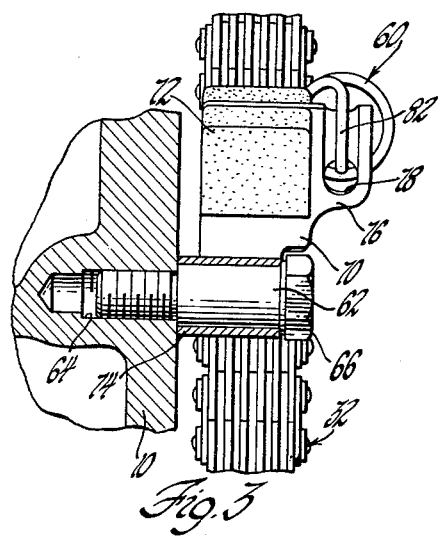
FIGURE 3 is a side view of one of the bumper members illustrated in FIGURE 2 and taken substantially along the line 3—3 of FIGURE 2 and looking in the direction of the arrows.
Figure 4:
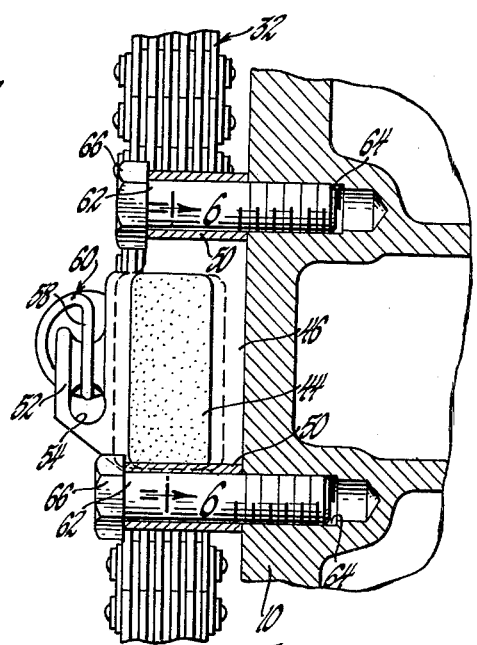
FIGURE 4 is a side view of the other of the bumper members illustrated in FIGURE 2 taken substantially along the line 4—4 of FIGURE 2 and looking in the direction of the arrows.

As illustrated in FIGURES 1 and 2, timing chain 32 includes a pair of tangent portions 34, extending between the sprockets 28 and 30, and wrap portions 36 and 38 passing around the sprockets 28 and 30, respectively. The timing chain rotates the camshaft 26 upon rotation of the crankshaft 24 and drives the intake and exhaust valves in the engine. Crankshaft 24 and camshaft 26 are the shafts which may have torque variations due to the action of the engine pistons and the valve spring values and movements of the intake and exhaust valves in their respective cylinders.

In order to take up the chain slack and chain whip incited by torque variations, and the resultant vibration and rattle in the timing chain 32, bumper members, illustrated generally by the numerals 40 and 42, are provided on opposite sides of the timing chain. FIGURES 2–7 best show the construction of the bumper members.

Bumper member 40 has a resilient or rubber portion 44 molded about a retainer member 46. Retainer member 46 is shown to include a flat body portion 48 terminating in rolled bolt cylinders 50 which permit securement to the engine block, as will be hereinafter described. Retainer portion 46 has a tab 52 extending from one side thereof and provided with a hole 54 and a curled portion 56 to receive the looped end 58 of a spring, illustrated generally by the numeral 60.

Figure 5:
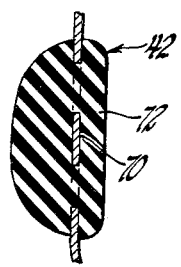
FIGURE 5 is a cross-sectional view of one of the bumper members illustrated in FIGURE 2 showing its manner of construction.
Figure 6:
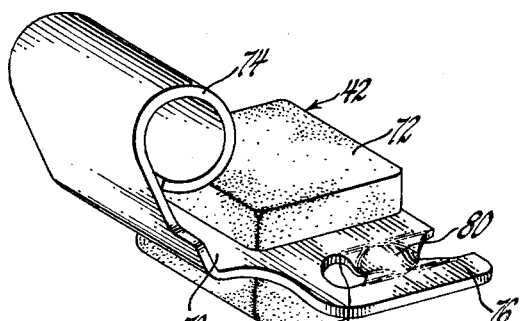
FIGURE 6 is an isometric view of the bumper member illustrated in FIGURES 2 and 3.
Figure 7:
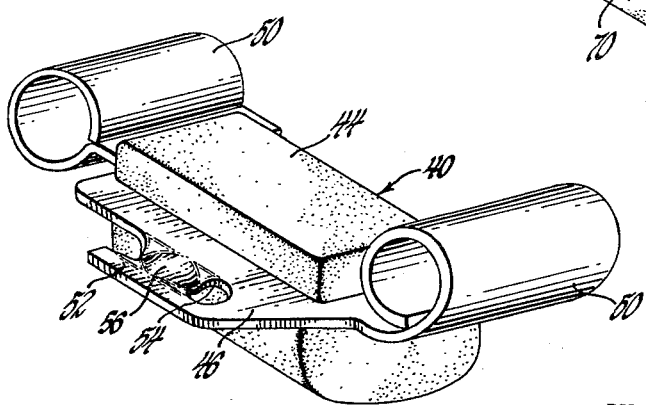
FIGURE 7 is an isometric view of the bumper member illustrated in FIGURES 2 and 4.

The bumper 40 is secured in the engine block 10 adjacent the outer side of one of the tangent portions 34 of the timing chain 32. A pair of bolts 62 are received in threaded bores 64 formed in the engine block 10 and are received in the bolt cylinders 50 formed in the retainer member 46. Bolts 62 are provided with suitable enlarged heads 66 which permit driving the bolts in the usual manner into the engine block 10. Thus, the bumper member 40 is rigidly secured in the engine block 10 such that the rubber member 44 engages the timing chain 32. Bumper member 42 is similar in construction, having a retainer portion 70 molded into a rubber or resilient member 72, as illustrated in FIGURE 5, and terminating in a single bolt cylinder 74. Retainer member 70 is provided with a tab 76 having a hole 78 and curled portion 80 to receive the loop 82 of spring 60. Bumper member 42 is pivotally secured in the engine block 10 by means of a third bolt 62, received in a threaded aperture 64 in the engine block 10. An enlarged head 66 permits driving of the bolt into the engine block 10. Thus, bumper member 42 is securely mounted in the engine block 10 and pivotal in the direction of the timing chain 32 and engaging one side of another tangent portion 34 to bias the timing chain inwardly and to frictionally engage the chain 32 to take up vibrations and rattle.

It is to be noted that both bumper members 40 and 42 may be pivotally mounted in the engine block in the manner of bumper member 42, so that both tangent portions 34 of the timing chain 32 may be biased inwardly. In such a situation, the bumper members would both be substantially the same as bumper member 42, but with one the mirror image of the other.

It is further to be noted that the fixed bumper member may be mounted to engage either tangent portion of the timing chain 32, although for best operation of the construction, and it is preferred, that the fixed bumper 40 be secured to engage the tension side of the chain 32 rather than the slack side thereof.

In order to bias the bumper members inwardly, or to bias bumper member 42 inwardly against the timing chain 32, spring 60 extends between the two retainer portions 46 and 70. As above described, hooked portions 58 and 82 of spring 60 are suitably received in the retainers 46 and 70, respectively, tending to pull the rubber portion 72 toward rubber portion 44. It is to be noted that separate springs may be utilized to bias the bumper members inwardly, or any other suitable construction capable of biasing the bumper members 40 and 42 in the proper direction.

In those engine constructions where there are other members driven by the timing chain as well, such as a generator or the like, this device may still be utilized. The bumper members 40 and 42 would be located between various of the sprocket gears and engaging the outer surface of the timing chain at such points.

The operation of the device is such that as the crankshaft 24 and sprocket 28 are rotated by the engine pistons, sprocket 30 and camshaft 26 will be rotated by the timing chain 32. The torque variations set up by the intake and exhaust valve springs acting through the camshaft 26, and by the pistons acting through the crankshaft 24, which would normally cause vibration and rattle in the timing chain 32, are effectively taken up or dampened by the bumper members 40 and 42. Spring 60 causes the rubber portions 44 and 72 to engage the timing chain 32 and take up such vibrations.

Thus, it may be seen that a relatively inexpensive device is provided which eliminates objectionable vibrations and noise in the operation of the timing chain of an internal combustion engine. The device is positive in its action and eliminates an excessive amount of wear in the timing chain.

What is claimed is:

In an internal combustion engine having four cylinders or less and having an engine block, a crankshaft and a camshaft mounted in said block and in spaced relationship with respect to each other, a sprocket mounted on the end of each of said shafts, a timing chain trained around each of said sprockets, said crankshaft driving said camshaft through said sprockets and said chain, a first bumper member molded about a first retainer member and disposed adjacent the outer side of a tangent portion of said chain, said retainer member being rigidly mounted in said block with said bumper member engaging said chain, a second bumper member molded about a second retainer member and disposed adjacent the outer side of the other tangent portion of said chain, said second retainer member being pivotally mounted in said block and rotatable thereabout to bring said second bumper member into engagement with said chain, and a spring connecting said first and second retainer members and biasing said second retainer member toward said first retainer member to take up vibrations in said chain caused by torque variations in one of said shafts.

References Cited in the file of this patent

FOREIGN PATENTS

| | | |
|---|---|---|
| 742,092 | Great Britain | Dec. 21, 1955 |
| 525,293 | Canada | May 22, 1956 |
| 1,190,167 | France | Mar. 31, 1959 |